United States Patent
Schulze, Jr.

(10) Patent No.: US 6,497,360 B1
(45) Date of Patent: Dec. 24, 2002

(54) PROMPT COUPON REIMBURSEMENT AFTER COUPON REDEMPTION

(75) Inventor: Everett E. Schulze, Jr., Aurora, CO (US)

(73) Assignee: In-Store Media Systems, Inc., Aurora, CO (US)

(*) Notice: Subject to any disclaimer, the term of this patent is extended or adjusted under 35 U.S.C. 154(b) by 20 days.

(21) Appl. No.: 09/626,345

(22) Filed: Jul. 26, 2000

(51) Int. Cl.[7] .............................. G06K 7/01; G06K 7/10
(52) U.S. Cl. ..................... 235/381; 235/462.01; 705/14
(58) Field of Search .............................. 235/375, 383, 235/381, 487, 494, 462.36, 462.37, 462.38, 462.39, 462.4, 472.01, 472.03; 705/14

(56) References Cited

U.S. PATENT DOCUMENTS

| | | | |
|---|---|---|---|
| 4,910,672 A | * 3/1990 | Off et al. ................... 364/405 |
| 5,008,519 A | 4/1991 | Cunningham et al. ...... 235/383 |
| 5,128,520 A | 7/1992 | Rando et al. ............... 235/375 |
| 5,245,533 A | * 9/1993 | Marshall .................... 364/401 |
| 5,483,049 A | * 1/1996 | Schulze, Jr. ................ 235/383 |
| 5,581,064 A | * 12/1996 | Riley et al. ................. 235/383 |
| 5,612,868 A | * 3/1997 | Off et al. ................... 364/214 |
| 5,905,246 A | * 5/1999 | FajKowski .................. 235/375 |
| 5,978,013 A | * 11/1999 | Jones et al. ................. 348/10 |
| RE37,166 E | * 5/2001 | Rando et al. ............ 235/462.36 |
| 6,292,786 B1 | * 9/2001 | Deaton et al. ................ 705/14 |
| 2001/0016502 A1 | * 8/2001 | Shirai ......................... 455/558 |
| 2001/0039512 A1 | * 11/2001 | Nicholson ..................... 705/14 |

FOREIGN PATENT DOCUMENTS

JP 403042797 A * 2/1991

OTHER PUBLICATIONS

Coupons: A Complete Guide, Joint Industry Coupon Guidelines, Joint Industry Coupon Committee, 1998.
The Let's Go Shopping Coupon Manager, Aug. 1999.

* cited by examiner

Primary Examiner—Thien M. Le

(57) ABSTRACT

Method and apparatus for accurately collecting and promptly reporting information in connection with the redemption of manufacturer coupons are provided. The method includes the collection of information from a retailer point-of-sale system, and the examination of redeemed coupons. Where matches between product sales, discounts to consumers and redeemed coupons can be made, payment to the retailer of discounts extended to consumers in exchange for manufacturer authorized coupons is immediately made following such verification. In addition, information concerning the redemption of coupons is made available to manufacturers to enable them to adjust promotions to achieve the desired marketing effect. The apparatus of the present invention may comprise a central processing unit and attached peripherals capable of interfacing with a retailer point-of-sale system and downloading information from the point-of-sale system, together with secure storage for holding coupons that are to be verified by the apparatus.

32 Claims, 9 Drawing Sheets

| THE FIRST COUPON BANK | THE FIRST COUPON BANK |
|---|---|
| 15423 EAST BATAVIA DRIVE, AURORA, CO 80111<br>303-364-6550  303-364-6564 (F)<br>COUPON COLLECTION<br>Collected from Store #:  99999<br>Schultze's Techno.Mart<br>15423 EAST BATAVIA DRIVE, AURORA, CO 80111<br>303-364-6550<br>Store Manager:  John Smith<br>Assistant Manager:  Judy Jones<br>Assistant Manager:  Mike Martin<br>Head Clerk:  Jessica Harper<br><br>COUPON SUMMARY<br>START: 11:30A, 1/26/00   STOP: 11:55A, 1/27/00<br><br>              NUMBER   VALUE<br>Scan Count     1,294     $617.40<br>POS Count      1,353     $676.50<br>Plus/(Minus)    (119)     ($59.10)<br><br>Collected By: Joe Serviceman<br><br>Check #99999999991    Amount: $617.40<br><br>SCHULZE'S TECHNO.MART<br>confirms that the coupons collected were redeemed only by our customers for the specified brands, sizes, flavors, and quantities and/or combination thereof, if any, indicated on the face of the coupon, and that the faced amount of the coupon was deducted from the retail selling price at the time or purchase. To our knowledge and understanding, the coupons redeemed by our customers were not reproduced or altered in any way, they were redeemed prior to the expiration date, and our customers were the original recipients of the coupons. This is a Bill of Sale to In Store Media Systems, Inc. (ISMSI) for the coupons collected. All rights, title, and interest to these coupons are conveyed to ISMSI, including reimbursement for the face value or retail price of free goods, plus $0.06 handling fee, regular postage expenses, and all other applicable reimbursement provisions of the manufacturer's coupon redemption policy.<br><br>APPROVAL:<br><br>Signature of Authorized Representative<br><br>Name (please print)<br><br>Date<br><br>                                   Bill of Sale | 15423 EAST BATAVIA DRIVE, AURORA, CO 80111<br>303-364-6550  303-364-6564 (F)<br>COUPON COLLECTION<br>Collected from Store #:  99999<br>Schultze's Techno.Mart<br>15423 EAST BATAVIA DRIVE, AURORA, CO 80111<br>303-364-6550<br>Store Manager:  John Smith<br>Assistant Manager:  Judy Jones<br>Assistant Manager:  Mike Martin<br>Head Clerk:  Jessica Harper<br><br>COUPON SUMMARY<br>START: 11:30A, 1/26/00   STOP: 11:55A, 1/27/00<br><br>              NUMBER   VALUE<br>Scan Count     1,294     $617.40<br>POS Count      1,353     $676.50<br>Plus/(Minus)    (119)     ($59.10)<br><br>Collected By: Joe Serviceman<br><br>Check #99999999991    Amount: $617.40<br><br>SCHULZE'S TECHNO.MART<br>confirms that the coupons collected were redeemed only by our customers for the specified brands, sizes, flavors, and quantities and/or combination thereof, if any, indicated on the face of the coupon, and that the faced amount of the coupon was deducted from the retail selling price at the time or purchase. To our knowledge and understanding, the coupons redeemed by our customers were not reproduced or altered in any way, they were redeemed prior to the expiration date, and our customers were the original recipients of the coupons. This is a Bill of Sale to In Store Media Systems, Inc. (ISMSI) for the coupons collected. All rights, title, and interest to these coupons are conveyed to ISMSI, including reimbursement for the face value or retail price of free goods, plus $0.06 handling fee, regular postage expenses, and all other applicable reimbursement provisions of the manufacturer's coupon redemption policy.<br><br>APPROVAL:<br><br>Signature of Authorized Representative<br><br>Name (please print)<br><br>Date<br><br>                                   Bill of Sale |
| OUR COPY | STORE COPY |

ISMSI             **\*\*VOID AFTER 90 DAYS\*\***            9-99999-0000001

IN STORE MEDIA SYSTEMS, INC.                                    DATE_____
15423 EAST BATAVIA DRIVE, AURORA, CO 80111

PAY TO
THE ORDER OF _____     $   617.40

SIX HUNDRED SEVENTEEN and 40/100                             DOLLARS

NORWEST BANK COLORADO
1450 SOUTH HAVANA STREET
AURORA, CO 80012-4016                                                     Everett E. Schulze, JR.

|:516300391|:1201234567"9999990000001|"

*FIG. 7*

Sample Daily Invoice – XYZ Package Goods Manufacturer Coupon Activity Report for 9/22/99

IN STORE MEDIA SYSTEMS, INC.

*Manufacturer/Distributor of the Coupon Exchange Center System*

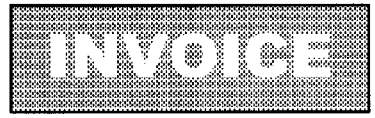

15423 East Batavia Drive
Aurora, Colorado 80111
Tel: 303-364-6550      Fax: 303-364-6564
Email: instoremedia@uswest.net Invoice Number: xyz13211-265
Date: 9/23/99

TO: XYZ Package Good Manufacturer, Inc.
Happy Trails Road
Manufacturersville NJ 65432
Attn: William Sargrave FROM: In Store Media Sysems, Inc.
15423 East Batavia Drive
Aurora, CO 80111

| | |
|---|---:|
| Number of Coupons Cleared on 9/22/99 | 1,051,700 |
| Total Face Value Redeemed on 9/22/99 | $ 618,029.57 |
| Total Redemption Fee Earned on 9/22/99 | $ 84,136.00 |
| Total Due and Payable | $ 702,165.57 |
| Total Products Sold on 9/22/99 | 53,278,137 |
| Number of Coupons Redeemed as a % of Sales | 2.0% |

| | |
|---|---:|
| Number of Coupons Redeemed, Year-to-Date | 278,700,500 |
| Total Face Value Redeemed, Year-to Date | $ 163,777,836.05 |
| Total Redemption Fee Earned, Year-to-Date | $ 22,926,040.00 |
| Total Year-to-Date | $ 186,073,876.05 |

*Please Make EFT Payments to:*

Commercial World Bank
c/o In Store Media Systems, Inc.

Payment Authorized by          Date

SampleReporttoMFGs     CONFIDENTIAL - - In Store Media Systems, Inc.     Page 1 of 1

FIG. 9

PROMPT COUPON REIMBURSEMENT AFTER COUPON REDEMPTION

FIELD OF THE INVENTION

The present application relates to systems for tracking customer purchase transactions. In particular, the present invention relates to systems for accurately tracking the use of coupons redeemed by consumers, and for promptly reimbursing retailers for discounts extended to consumers in exchange for coupons presented to the retailer.

BACKGROUND OF THE INVENTION

Coupons are typically distributed to consumers by consumer packaged goods manufacturers (PGM) as a marketing tool to encourage consumers to purchase their products. The coupons are distributed to consumers through any one of a number of different channels, including through newspapers as freestanding insert (FSI) coupons, advertising circulars, direct mailings, e-mail, and the Internet. To redeem a coupon, a consumer must generally present the coupon in connection with the purchase of a product identified on the coupon at a retail establishment. The retailer, upon receiving the coupon, will deduct the face value of the coupon from the total amount owed by the consumer. The retailer generally does not receive reimbursement for the discount extended to the consumer until the redeemed coupon has been subjected to a lengthy retailer redemption verification process.

In order to verify the legitimacy of discounts extended to consumers by retailers, product manufacturers generally require retailers to provide them with the original redeemed coupons in support of invoices seeking reimbursement. Accordingly, retailers typically bundle together redeemed coupons and ship them to third party clearinghouses, which sort the redeemed coupons by product manufacturer. The sorted coupons, together with the retailer invoices, are then shipped to a manufacturer's agent. The manufacturer's agent, which in some instances may be associated with a clearinghouse, attempts to determine whether the invoice amount is supported by the redeemed coupons. In addition, the manufacturer's agent typically examines the redeemed coupons for evidence of fraud, which may be indicated by a large number of evenly cut coupons or by counterfeit coupons. The manufacturer's agent then may issue a check to the retailer through the clearinghouse as reimbursement for the value of the coupons verified by the agent as genuine. Any invoiced amount that is not adequately supported by the provided original coupons will not be paid by the manufacturer or its agent. Retailers often respond to such "chargebacks" by deducting the amount of the chargeback from amounts paid to the product manufacturers for products delivered to the retailer. Where a check is issued for the retailer, it is generally not received until six to eight weeks after the original discount was extended to the consumer by the retailer. Accordingly, the redemption of manufacturer coupons requires retailers to forego receipt of full value for items purchased using a coupon for a significant period of time.

In addition to the significant time delays involved in the processing of coupons using traditional methods, such methods are also vulnerable to fraud and do not provide product manufacturers with timely marketing data. For instance, there is no way for a manufacturer to precisely determine whether the redemption of a coupon was accompanied by a bona fide product sale. This is because traditional methods of coupon redemption do not correlate a specific product sale to each specific redeemed coupon at the time of redemption at the store. The redeemed coupons are not segregated according to the store at which they were redeemed and there is no accurate data that correlates coupons and sales of products. Instead, manufacturers have only a general idea of the volume of product sales expected for particular retail chains. Accordingly, fraud can usually only be detected by product manufacturers if it is carried out on a large scale. Additionally, product manufacturers do not receive timely or accurate marketing data using traditional coupon redemption and verification methods. This is because coupons are often bundled together by retail chain rather than by a particular retail outlet. In addition, the manufacturer receives no information regarding the date and place of redemption, or regarding the precise products or product configuration purchased in connection with the redemption of the coupon.

For the above stated reasons, it would be beneficial, as supported by the Joint Industry Coupon Council (JICC), to enhance the redemption of coupons, particularly providing for prompt reimbursement to retailers for discounts extended by them to consumers. Furthermore, it would be advantageous to provide the issuers of coupons with accurate and timely information concerning the circumstances of the coupon redemption and to enable the issuer to verify the validity of coupon redemptions. In addition, it would be advantageous to provide such a method and apparatus that can be implemented at an acceptable cost and that is operated by a third party who is trustworthy and reliable.

SUMMARY OF THE INVENTION

In accordance with the present invention, a system for accurately tracking the use of coupons and for promptly reimbursing retailers for discounts extended in exchange for such coupons is provided. The disclosed system generally includes a coupon redemption subsystem interconnected to a point-of-sale (POS) subsystem by a communications channel. In one embodiment, a passive tap from the POS controller is employed. The system can record the same transactions as the retailer does. A transaction log is generated that enables the system to provide coupon information and product UPC information. The POS subsystem can include a main computer or server of the retailer that commonly communicates with a number of check-out stations at which products are purchased, such as grocery items offered by a supermarket retailer. Each check-out station includes a cash drawer or electronic cash register (ECR), together with a product scanner. The product scanner reads the UPC (universal product code) on the product as part of the check-out procedure. In general, the coupon redemption subsystem is adapted to interface with this point-of-sale subsystem to receive information regarding the sale of products and any associated discounts (e.g. coupons being redeemed) from the point-of-sale subsystem. In addition, the coupon redemption subsystem is adapted to store information associated with redeemed coupons and to attempt to match that information to product sale and discount information downloaded from the point-of-sale subsystem.

In operation, information regarding product sales and discounts is entered into the point-of-sale subsystem by retailer personnel. Coupons redeemed in connection with consumer transactions are collected by the retailerpersonnel. According to one embodiment of the present invention, the redeemed coupons are input and stored in a secure container (e.g. a safe or lock box) that is not accessible to retailer personnel.

A suitable number of such redeemed coupons are collected by the retailer. The suitable number is based on a plurality of different customer transactions with the retailer typically occurring throughout a day, week or other acceptable time interval. After being collected and placed in the secure container, coupon verification personnel, preferably a third party not affiliated with the retailer, remove the coupons and cause coupon information to be input into the coupon redemption subsystem. The coupon information is input using a reader, scanner, or other coupon information input device that is separate and different from the scanner or input device of the point-of-sale subsystem. This information is also stored in the coupon redemption subsystem. Information regarding product sales and discounts extended by the retailer to consumers in connection with product sales is downloaded from the point-of-sale subsystem to the coupon redemption subsystem. The download may occur as an automatic transfer of files at periodic intervals including real time or substantially real time, or as a transfer of files prior to the verification of coupon redemptions by the coupon verification personnel. This download may occur over the communications channel, or may be accomplished by transferring a removable storage medium from the point-of-sale subsystem to the coupon redemption subsystem. In yet a further alternative, information from the point-of-sale subsystem may be transferred to the coupon redemption subsystem in real time.

After the information relating to redeemed coupons has been entered into the coupon redemption subsystem, and sales information has been downloaded from the point-of-sale subsystem, the coupon redemption subsystem establishes matches between the redeemed coupons and product sales. In connection with those coupons for which a match is successfully made, payment is made to the retailer in the amount of the face value of the coupon. Payment may be made to the retailer by check, electronic funds transfer, or other mutually acceptable payment. According to one embodiment, payment is made by a check printed using the coupon redemption subsystem before the coupon verification personnel leave the retailer premises. With respect to making of the payment of coupons that have been properly redeemed and verified, such payment is usually made within three days and preferably within one day (e.g., same day) of a proper coupon being redeemed by the retailer. Coupons not cleared or unverified may later be cleared for payment, although such payment is made after a considerably longer period of time. In no event is such a payment for verified coupons made more than ten days from the redemption of that coupon which is being reimbursed. In that regard, a single payment to the retailer typically handles or covers a significant number of redeemed coupons that are a result of coupon transactions with a number of different customers. For example, the payment to the retailer can cover coupon redemptions involving at least ten different customers. Prior to or concurrent with payment to the retailer, ownership of such redeemed coupons is transferred from the retailer to the coupon verification personnel so that ownership rights in the reimbursed coupons can pass to this third party from the retailer before these coupons are allowed to be transferred or moved from the retailer's facility.

Information collected concerning the redemption of coupons is provided to both the retailer and the product manufacturers whose coupons have been redeemed. In particular, the retailer is provided with a summary of coupons redeemed including product information represented by the bar code, in connection with all product manufacturers and the particular product associated with the redemption. Each product manufacturer is provided with information concerning the redemption of coupons it has authorized and correlated with sales of its products. This information may include the location, date and time of the product sales, and where available, information concerning the individual consumer. This information may be made available to the manufacturer over a computer network, such as the Internet, and may be made available in substantially real time.

Additional advantages of the present invention will become readily apparent from the following discussion, particularly when taken together with the accompanying drawings.

BRIEF DESCRIPTION OF THE DRAWINGS

FIG. 7 is a representative example of a retailer report, release and check in accordance with an embodiment of the present invention;

FIG. 9 is representative of an invoice to a manufacturer by a third party coupon verifier for coupons purchased by the third party verifier from a retailer.

DETAILED DESCRIPTION

Figure 1:
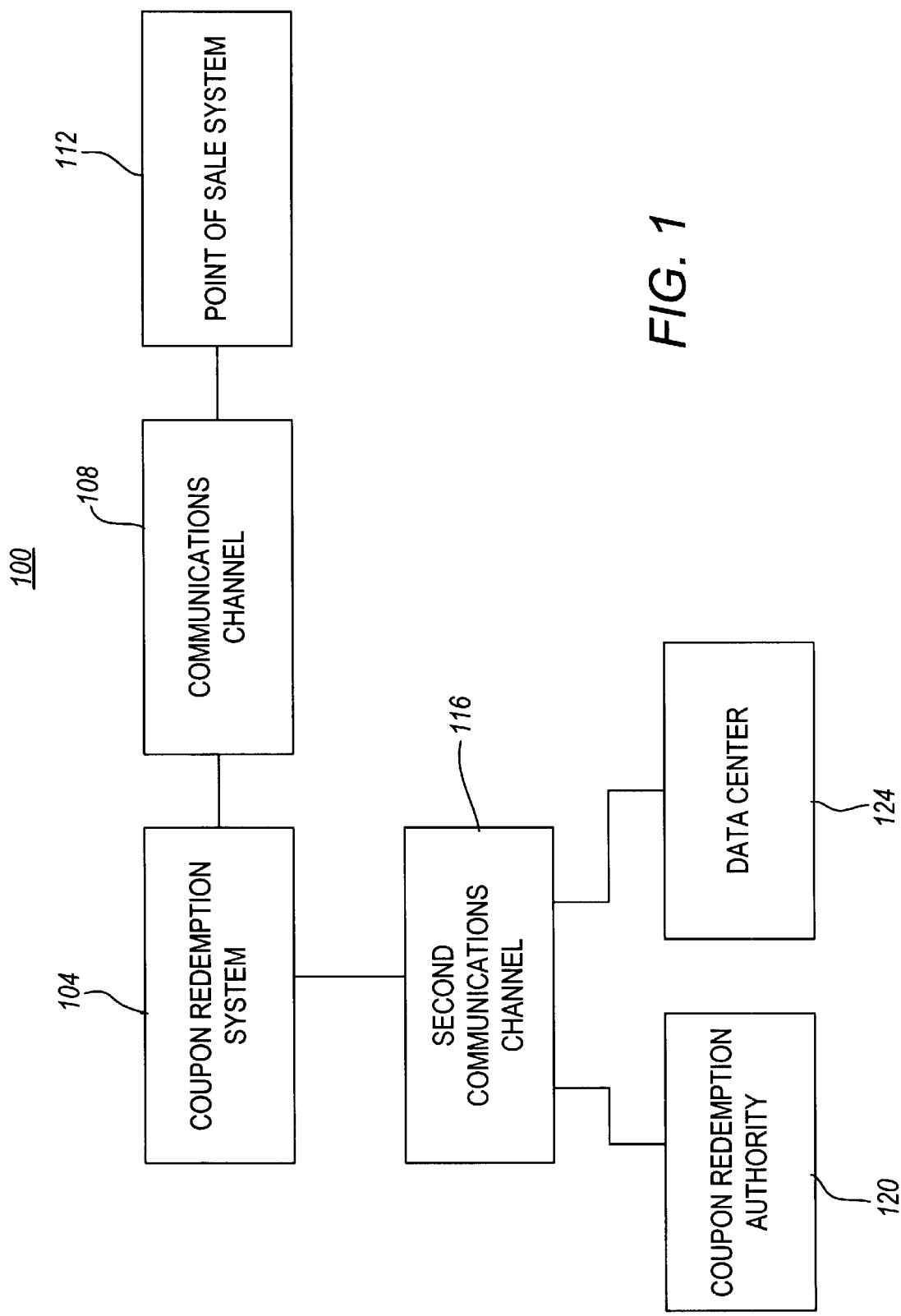
FIG. 1 is a block diagram of a coupon redemption system according to an embodiment of the present invention.

FIG. 1 illustrates a coupon redemption system 100. The coupon redemption system 100 generally includes an auxiliary computer or coupon redemption subsystem 104, a communications channel 108 and a point of sale (POS) subsystem 112. The system 100 may also include a second communications channel 116, which may be used to interconnect the coupon redemption subsystem 104 to a coupon redemption authority 120 and/or to a data center 124.

The communications channel 108 serves to transfer information between the coupon redemption subsystem 104 and the point of sale subsystem 112. Accordingly, the communications channel 108 may comprise a computer network, such as a local area network (LAN), for example an Ethernet network, or a wide area network (WAN), for example the Internet or a token ring configuration or any other acceptable communication setup and/or protocol. The channel 108 may also comprise standard or proprietary serial or parallel type interconnections. The channel 108 cooperates with appropriate communications interfaces 216 and 316 provided as part of the point of sale 112 and coupon redemption 104 subsystems respectively.

Figure 2:
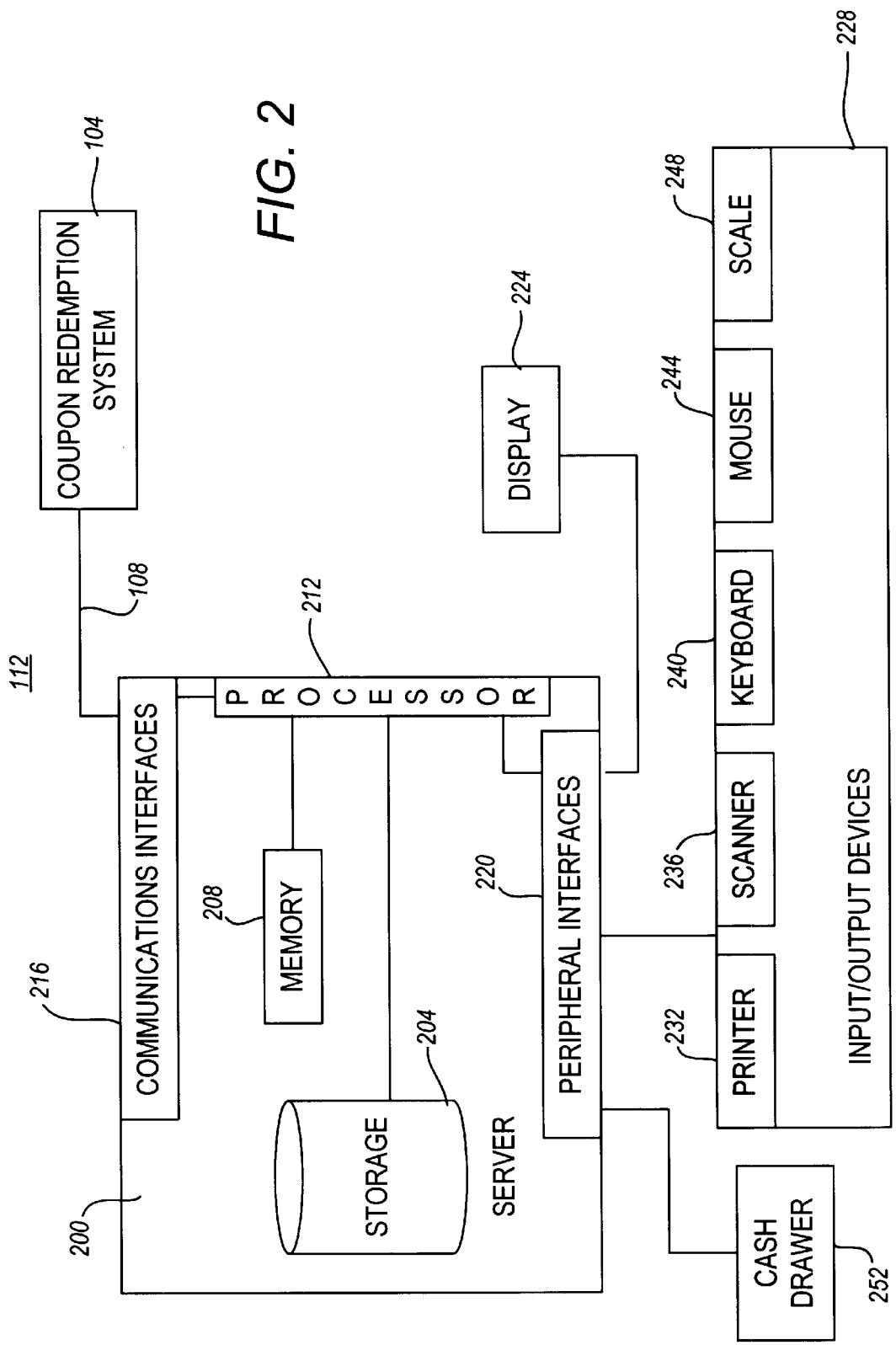
FIG. 2 is a block diagram of a point of sale system useable with an embodiment of the present invention.

In general the point of sale subsystem is used to track sales of retail goods to consumers. FIG. 2 represents a point of sale subsystem 112 useable with the coupon redemption subsystem 104 of the present invention. In general, the point of sale subsystem 112 includes a server 200 having associated storage 204, memory 208 and a processor 212. In addition, the server 200 may include communications 216 and peripheral 220 interfaces as required by the particular communications channel 108 and peripheral devices interconnected to the server 200. In a typical point of sale subsystem 112, the server 200 includes an Intel Pentium™ class processor 212 with a suitable hard disk and/or tape drive as the storage 204 and 64 Mb of solid state memory 208.

The peripheral devices associated with the point of sale subsystem 112 may include a display 224, such as a cathode ray tube or flat panel type display, and any one of a variety of input/output devices 228. The input/output devices 228 may include a printer 232, a scanner 236, a keyboard 240, a mouse 244 and a scale 248. The subsystem 112 may also be interconnected to a cash drawer 252.

In operation, the point of sale subsystem 112 is used to record sales of items to consumers. Accordingly, information regarding each product sold to a consumer is entered into the point of sale subsystem 112 using one or more of the input/output devices 228. For example, a cashier at a check-out station or point of sale may read a universal product code (UPC) using the scanner 236. The information read from the UPC may then be stored in the computer storage 204 of the server 200. If the consumer presents a coupon associated with the product, the cashier may discount the amount due from the consumer by the face value of the coupon. The value of the coupon may be entered into the point of sale subsystem 112 by scanning a bar code from the coupon using the scanner 236, a separate scanner, reader or other input device, or the cashier may enter the information manually by, for example, entering the amount of the discount using the keyboard 240. Information regarding redeemed coupons or discounts entered by the cashier may also be stored in the computer storage 204. As can be appreciated, there is usually a number of check-out stations. At each check-out station, a cashier is involved with checking out products being purchased and redeeming associated coupons for one or more of such products. Each of the check-out stations typically has its own scanner for handling the sales of products having UPCs. Each such scanner, and/or another coupon reader separate from the scanner, is used to input coupon information to the server 200.

Figure 3:
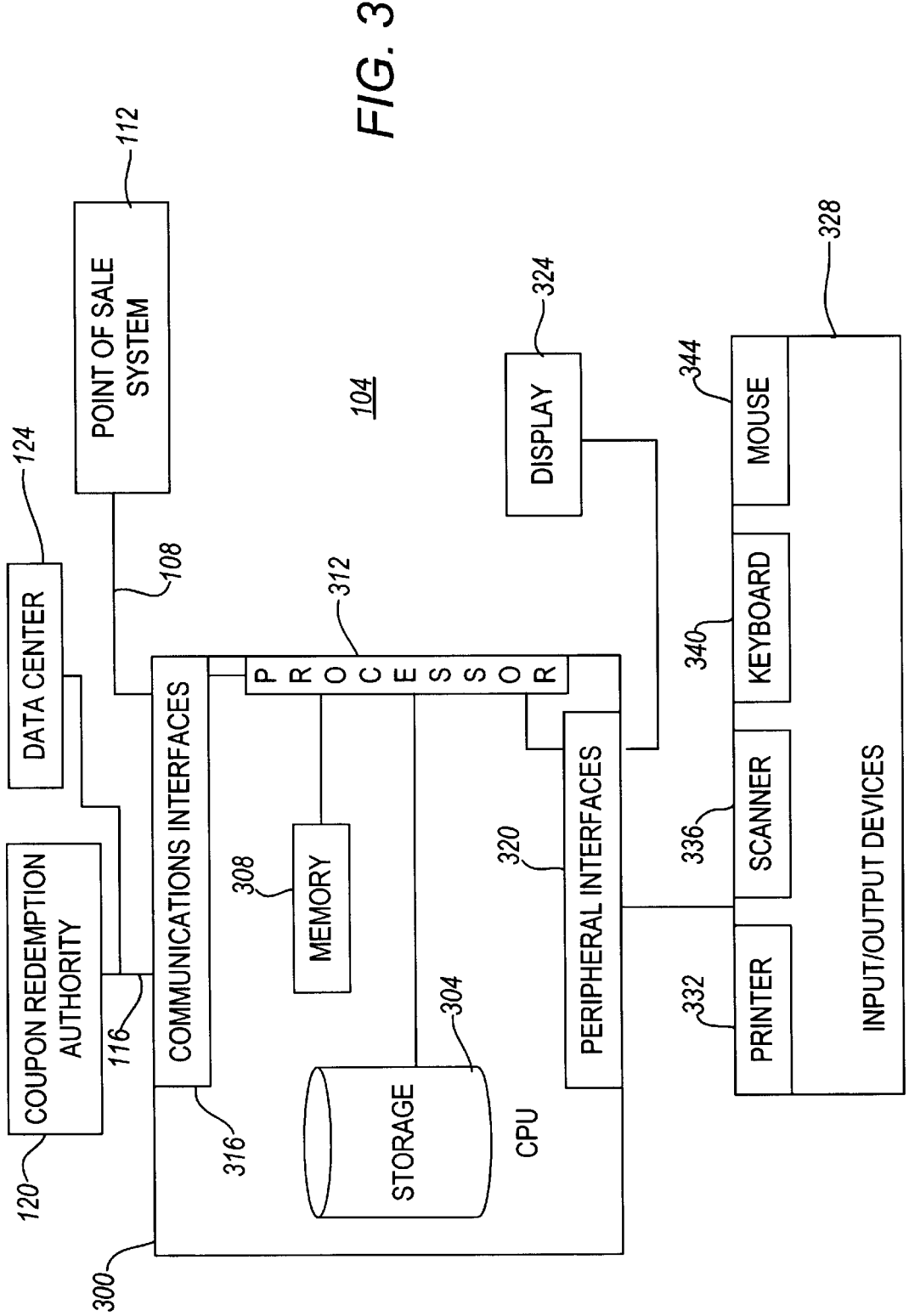
FIG. 3 is a block diagram of a coupon redemption system according to an embodiment of the present invention.

FIG. 3 is a block diagram representing the coupon redemption subsystem 104. As shown in FIG. 3, the coupon redemption subsystem 104 includes a central processing unit (CPU) 300 having data or information storage 304, program memory 308 and a processor 312. The CPU 300 may also include communications interfaces 316 and peripheral interfaces 320. Peripheral devices associated with the coupon redemption subsystem 104 may include a display 324, such as a cathode ray tube (CRT) or flat panel display, including a touch screen type display, and various input/output devices 328. The input/output devices 328 may include a printer 332, a scanner 336, a keyboard 340, and a mouse or other pointing device 344.

In general, at least one of the communications interfaces 316 cooperates with the communications channel 108 and at least one of the communications interfaces 216 of the point of sale subsystem 112 to pass information between the coupon redemption subsystem 104 and the point of sale subsystem 112. As noted above, the communications channel 108 may comprise a variety of channel types. In particular, where the communications channel 108 comprises a conventional local or wide area network, the communications interfaces 216 and 316 may comprise appropriate network interface cards. Where the channel 108 comprises a hard wired serial (e.g., RS 232 or USB) or parallel (e.g., SPP or EPP) interconnection, the communications interfaces 216 and 316 may comprise the ports conventionally provided on the CPU 300 or server 200. The communications network 108 may also comprise the public switched telephone network (PSTN), in which case the communications interfaces 216 and 316 may comprise modems. Where the communications channel 108 comprises the Internet, the communications interfaces 216 and 316 may comprise whatever interface is required by the coupon redemption subsystem 104 or the point-of-sale subsystem 112 to establish a connection to the Internet. It should be appreciated that any combination of communications channel 108 types may be utilized, and that the communications interface 216 of the point-of-sale system 112 need not be the same as the communications interface 316 of the coupon redemption subsystem 104. For example, the communications interface 316 of the coupon redemption subsystem 104 may comprise a modem for interconnecting the coupon redemption subsystem 104 and an Internet server (not shown), while the communications interface 216 of the point-of-sale system 112 may comprise a network card for interconnecting the point-of-sale subsystem 112 over a local area network to a server or router (not shown) in communication with the Internet. Accordingly, in the above example, the communications channel 108 comprises the PSTN, the Internet and a local area network.

In addition to conventional techniques for interconnecting computers such as those discussed above, the coupon redemption subsystem 104 and point-of-sale subsystem 112 may be interconnected by a proprietary type communications channel 108. Of course, the communications interfaces 216 and 316 need to be appropriate to the communications channel 108 utilized. For example, the coupon redemption subsystem 104 may "listen in" to activity occurring on the point-of-sale subsystem 112, and make a record of that activity in real time. Such monitoring of the point-of-sale subsystem 112 requires interfaces 216 and/or 316 that are capable of detecting the activity to be monitored and translating that activity into a signal that can be understood by the coupon redemption subsystem 104. The information monitored on the point-of-sale subsystem 112 may include information stored in the storage 204 of the point-of-sale subsystem 112 as part of the operation of the point-of-sale subsystem 112. Alternatively, information transferred between the various input/output devices 228 and the server 200 of the point-of-sale subsystem 112 may be monitored by the coupon redemption subsystem 104 and stored in storage 304.

From the above discussion, it should be appreciated that information may be transferred from the point-of-sale subsystem 112 to the coupon redemption subsystem 104 either in batches, or in real-time. Additionally, it should be appreciated that the communications channel 108 may serve to continuously interconnect the coupon redemption subsystem 104 to the point-of-sale subsystem 112. Alternatively, the channel 108, whether physical or virtual, may interconnect the coupon redemption subsystem 104 to the point-of-sale subsystem 112 only when transfers of information are taking place. In addition to the communications channel 108 interconnecting the coupon redemption subsystem 104 to the point of sale subsystem 112, a second communications channel 116 may be provided to interconnect the coupon redemption subsystem 104 to a coupon redemption authority 120 and/or to a data center 124.

The coupon redemption subsystem 104 may be configured such that it is easily portable. When so configured, coupon verification personnel may carry the coupon redemption subsystem 104 with them to each retailer location. Alternatively, the coupon redemption subsystem 104 may be kept in a back office or other area of the retail location at which the coupons are deemed. In another embodiment, the coupon redemption subsystem 104 may be maintained off-site from the premises of the retail location at which coupons are being redeemed. For example, the coupon redemption subsystem 104 may be at a facility under the control of the coupon verification third party or entity, which location may receive redeemed coupons from one or more different retailers. Accordingly, the coupon redemption subsystem 104 is not located at the check-out station or other area where products are being purchased. The coupon redemption subsystem 104 is usually located at least twenty feet away from at least one check-out station of the retailer, who is utilizing or relying on the services associated with the coupon redemption subsystem 104. Where the coupon redemption subsystem 104 is to remain at the retailer location, it may be provided with an integrated secure storage container (e.g. a safe or lock box) for holding redeemed coupons until the proper redemption of those coupons can be verified by coupon verification personnel.

Figure 4:
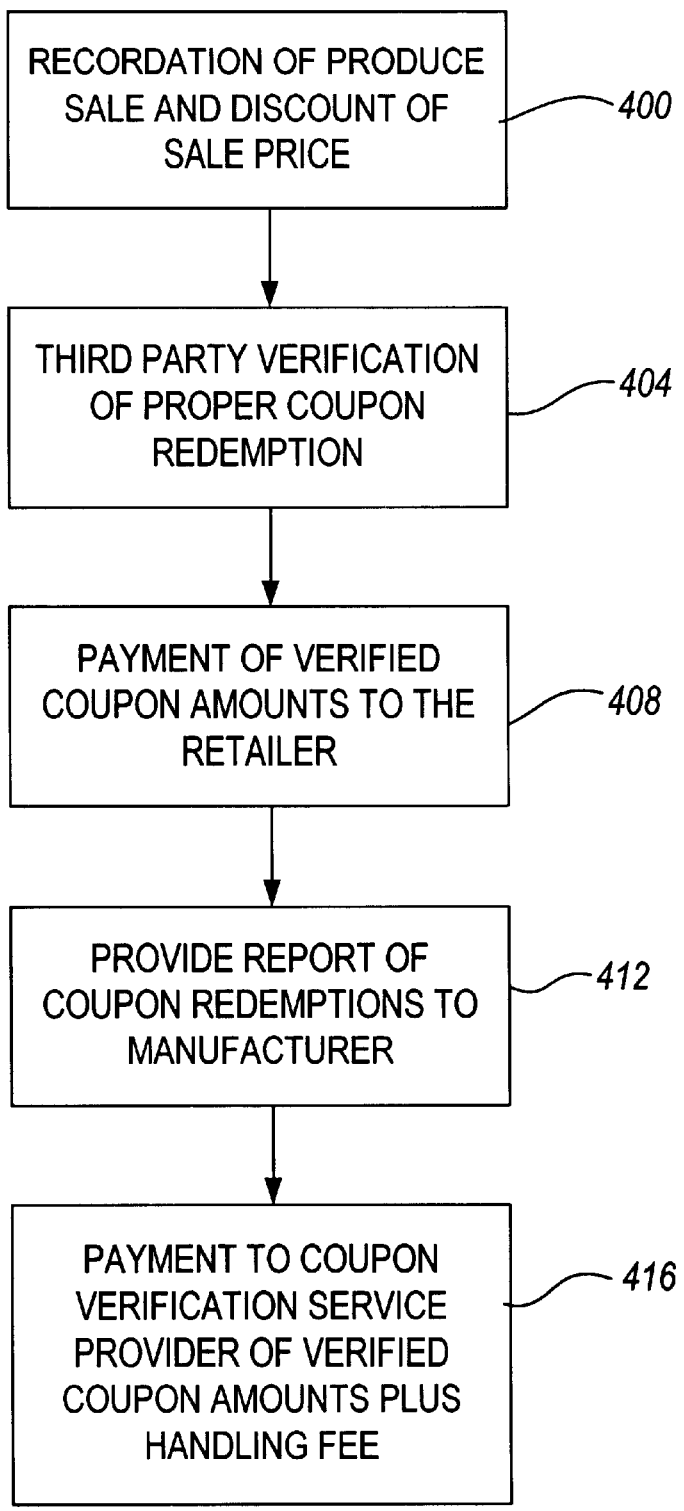
FIG. 4 is a flow chart illustrating the major steps taken in redeeming coupons according to the system of the present invention.

With reference now to FIG. 4, the major operational steps taken in redeeming coupons according to the present invention are illustrated. Initially, at step 400, a record is made of products sold to a consumer during a transaction in the point of sale subsystem 112. In addition, a record is made of any discounts provided by the retailer in connection with the transaction such as those associated with redeemed coupons. These records may be stored in the storage 204 associated with the point of sale subsystem 112. These steps are generally taken by the retailer in the normal course of completing a sale. As should be understood, such records being made related to coupons or other discounts and products being purchased are commonly conducted at each of a number of check-out stations. Regarding coupon transactions, these entail a number of different customers with one or more coupons that are redeemed over a definable time interval. Accordingly, the storage 204 keeps track of product purchases and coupons being redeemed by a number of check-out stations involving a number of different customer purchases or transactions.

At step 404, third party verification of the proper redemption of any coupons associated with a transaction is made using the coupon redemption subsystem 104, as will be discussed in more detail below. Next, at step 408, the retailer is reimbursed for discounts provided to consumers as a result of the proper redemption of coupons. At step 412, a report is provided to each product manufacturer whose coupons have been redeemed. The report provides various information concerning the circumstances of the coupon redemptions in connection with each manufacturer's products. Each manufacturer then makes payment to the third party verification provider in the amount of the reimbursements made to retailers attributable to coupons issued and/or authorized by each product manufacturer, plus a customary handling fee (step 416).

Figure 5:
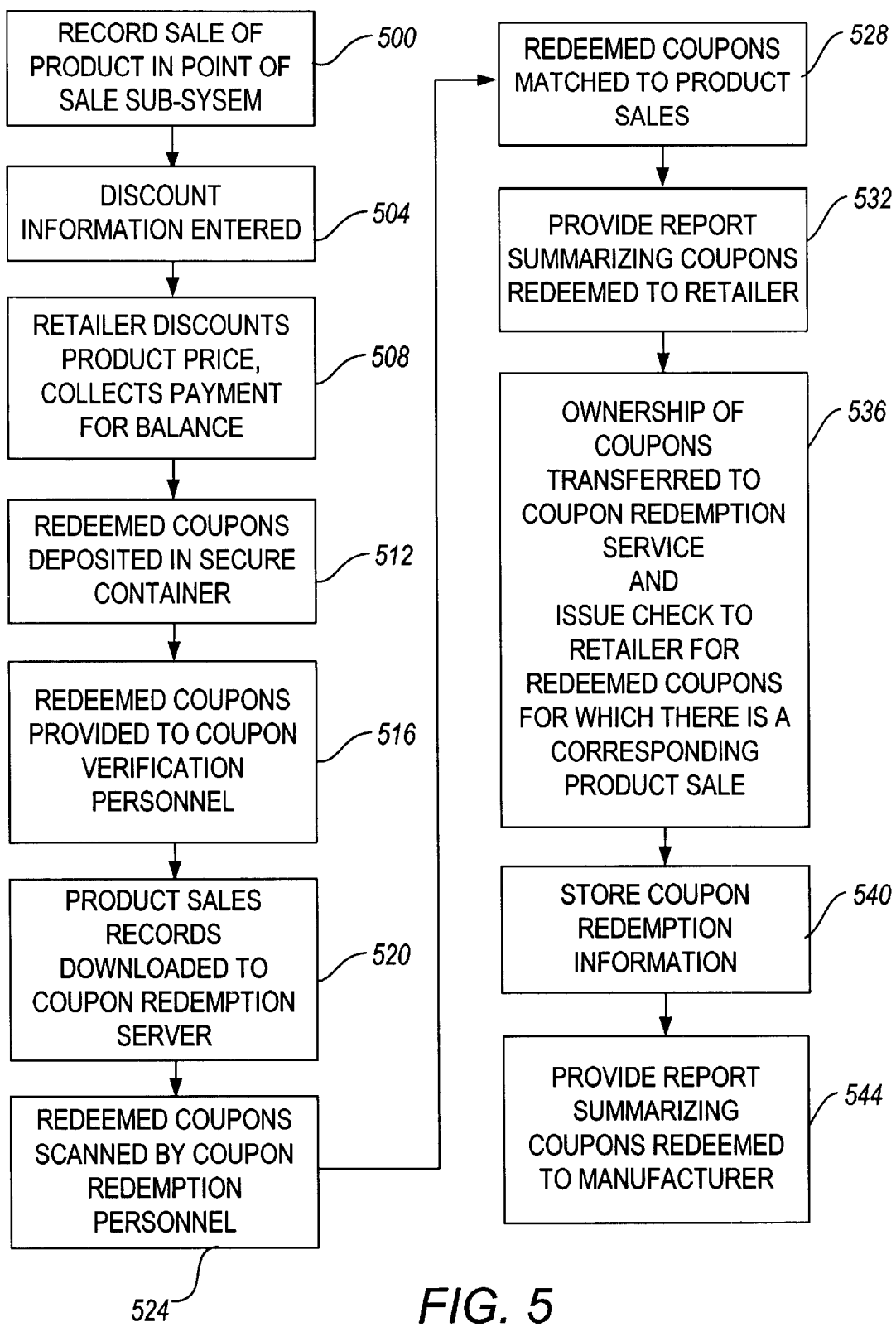
FIG. 5 is a flow chart of the operation of a coupon redemption system according to an embodiment of the present invention.

FIG. 5 is a flow chart illustrating the steps of recording sales information (step 400), third party verification of proper coupon redemption (step 404) and payment of verified coupon amounts to the retailer (step 408) illustrated generally in FIG. 4. Initially, at step 500, the sale of a product is entered into the point of sale subsystem 112. The information entered regarding the sale of a product may include such particulars as the product code, batch number, date of manufacture and/or expiration, product size and/or packaging configuration, etc. Information concerning the location of the retailer and information concerning the identity of the consumer may also be stored in connection with the sale of the product, as well as the date and time the transaction was completed. The information recorded concerning the sale of the product may be stored in the storage 204 associated with the server 200 of the point of sale subsystem 112.

The cashier may then, at step 504, enter information concerning any coupons or discounts associated with the sale of a product. For instance, the cashier may enter simply the amount of the discount manually by, for instance, typing that information using the keyboard 240 of the point of sale subsystem 112. Such discount information may or may not be associated with the collection of a coupon authorized by a manufacturer. Therefore, it will be appreciated that a valid coupon is not necessary in order for a cashier to issue a discount using a typical point of sale subsystem 112. Where a discount is associated with a manufacturer authorized coupon, information regarding the discount may also be entered by scanning a bar code provided on the coupon using the scanner 236, by reading coupon information using a coupon reader or other input device, or by manually entering information identifying the coupon. The cashier may also simply enter the amount of the discount provided to the consumer. After the products sold and any discounts have been entered into the point of sale system, payment of the total amount due, plus any taxes or other charges, but less the amount of any discounts entered, is collected from the consumer by the retailer (step 508). Where coupons are associated with the transaction, they are collected by the cashier and placed in a secure storage container or otherwise collected for later verification (step 512). Preferably, a secure storage container is used that allows only the third party verification service provider to access the redeemed coupons following a number of customer transactions or following the cashier's shift. For example, access to the redeemed coupons in the secure container may be made at periodic intervals, such as greater than three hours. Such access or subsequently utilizing the coupon redemption subsystem 104 involves more than one customer. For example, use of the coupon redemption subsystem 104 by coupon verification personnel involves at least ten customers, each of which redeemed at least one coupon.

The secure storage container(s), having the redeemed coupons, is (are) available to coupon verification personnel at step 516. In general, the coupon verification personnel visit retailer locations periodically in order to verify and otherwise process redeemed coupons. Where the volume of redeemed coupons at a retailer location is sufficiently high, for example 500 or more redeemed coupons per day, the coupon verification personnel preferably travel to the retailer location daily to perform the verification procedure. Where coupon volumes do not warrant daily visits by coupon verification personnel, those visits may be less frequent.

At step 520, the records of product sales collected at step 500 are downloaded to the coupon redemption computer or server 300. This download of information may be accomplished in any one of a number of ways. For example, the information may be downloaded from the point of sale subsystem 112 after the coupon verification personnel have arrived at the retailer location. Alternatively, sales records may be downloaded in batches to the coupon redemption system 104 automatically, either at predetermined time intervals or after the occurrence of predetermined events. As a further example, the coupon redemption system 104 may monitor activity occurring in the point of sale subsystem 112 and automatically record sales information in real time.

Although the download of information typically occurs over the communications channel 108, it may also be performed by a manual transfer of files containing the information to be downloaded. For example, a removable storage medium, such as a floppy disk, may be used to transfer information from the point of sale subsystem 112 to the coupon redemption subsystem 104.

At step 524, the coupon verification personnel retrieve the redeemed coupons from the secure storage container, and enter coupon identifying information into the coupon redemption subsystem 104. The identifying information may be entered into the coupon redemption subsystem 104 by reading information from the coupons using the scanner 336 or a coupon reader that might be controlled to destroy (e.g. shredding), or otherwise render unuseable, the coupon after it has been verified or accepted. Alternatively, identifying information may be entered manually, such as by using the keyboard 340. Information may be stored in the storage 304, and may include all of the identifying information encoded on the coupon, such as the face value, the product the coupon applies to, the expiration date of the coupon and information concerning the distribution method and/or recipient of the coupon.

It should be noted that steps 520 and 524 may be taken in any order with respect to one another, or they may taken concurrently. Following the completion of steps 520 and 524, the redeemed coupons are matched with product sales by the coupon redemption subsystem 104 (step 528). Information regarding properly redeemed coupons may be stored in the coupon redemption subsystem 104 (step 540). A report summarizing the redemption information may then be provided to the manufacturer (step 544). Preferably, each manufacturer is provided with information concerning the redemption of coupons authorized by the manufacturer in question.

Figure 6:
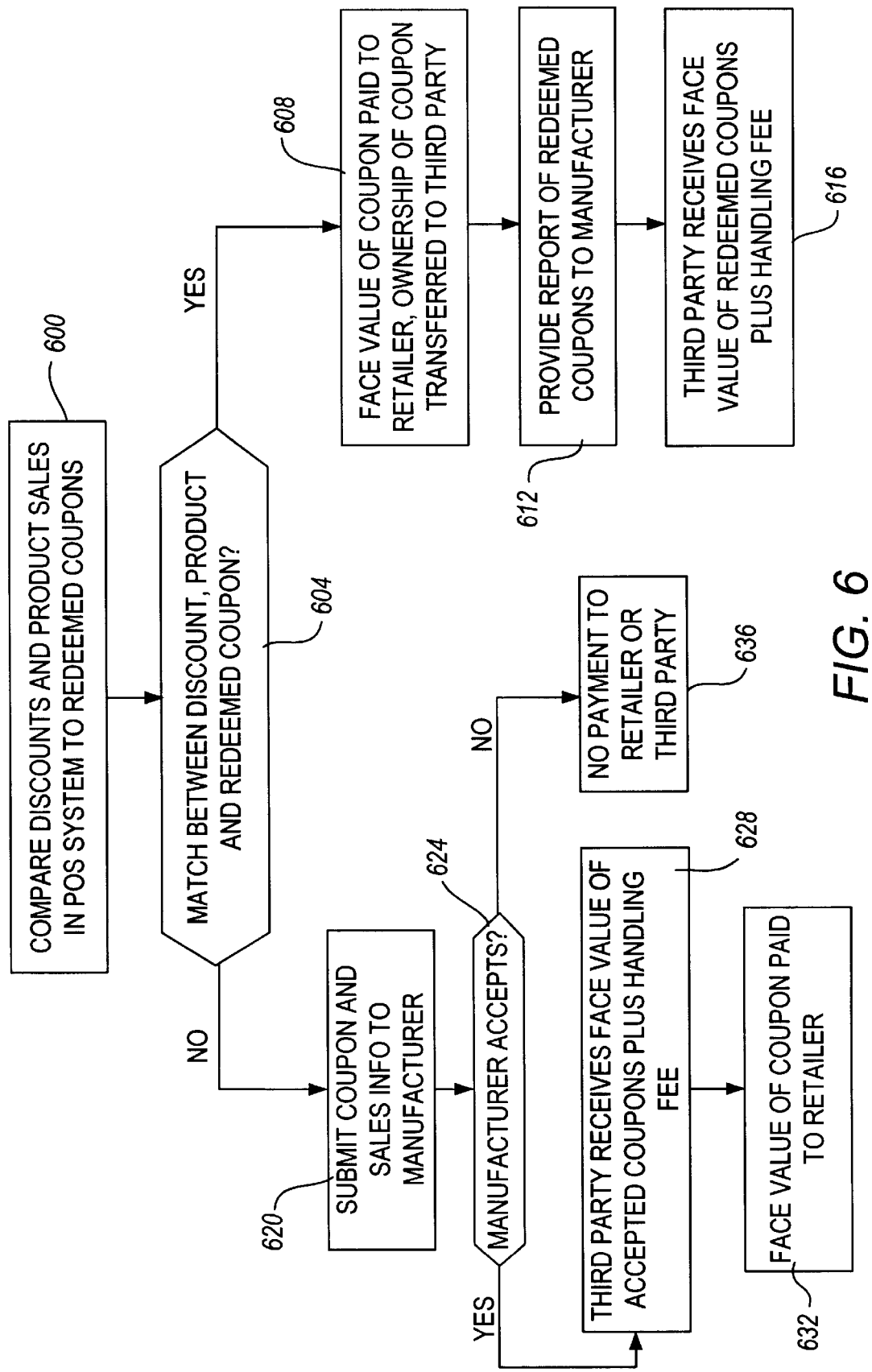
FIG. 6 is a flow chart of the coupon verification process according to an embodiment of the present invention.

With reference now to FIG. 6, the steps taken in accordance with one embodiment of the present invention in order to verify the proper redemption of coupons are illustrated in detail. At step 600, the discounts and product sales entered in the point-of-sale subsystem 112 and downloaded to the coupon redemption subsystem 104 are compared to the audit or verifying coupons that have been input (e.g. read or scanned) into the coupon redemption subsystem 104 (step 600).

The audit or verifying coupons being accessed were placed in the secure storage container by a person manually carrying the verifying coupons from each check-out station to the location having the secure storage container. In one embodiment, the cashier or other retailer employee manually carries redeemed coupons to be verified for insertion or other placement into the secure storage container, although an employee of the third party verifying entity might perform this task. When all coupons in the secure storage container are properly redeemed coupons, the audit coupons are the same as the redeemed coupons. That is, when coupons are being properly redeemed, there should be no difference between the audit coupons placed in the secure storage container and the redeemed coupons. However, it can occur that there is a difference between the redeemed coupons and the audit coupons. For example, store personnel, such as the cashier, may place in the secure storage container one or more coupons that are not properly redeemed coupons. Such placement could occur inadvertently or intentionally. In such a case, such an audit coupon was probably not scanned by the retailer's scanner.

After such information is received, the coupon redemption subsystem 104 then determines whether there is a match between the discount extended, a product sale, and a redeemed coupon (step 604). Generally, a valid match occurs where the amount of the discount is equal to the face value of the coupon, the consumer transaction includes the sale of a product for which the redeemed coupon was issued, and an audit or verifying coupon has been scanned into the coupon redemption subsystem 104 by the third party verification personnel. Accordingly, the coupon redemption subsystem 104 correlates the information scanned into that subsystem by the third party verification personnel to product sale and discount information downloaded from the point-of-sale subsystem 112.

If a proper match is found to exist between the information from the point-of-sale subsystem 112 and the input coupon information, the face amount of the redeemed coupon may be paid to the retailer by the third party verifier or verification service (step 608). Concurrent with or prior to payment of the face value of the redeemed coupons to the retailer, ownership of the verifying coupons is transferred from the retailer to the third party verification service (step 608).

At step 612, a report of the redeemed coupons is provided to the retailer. This report may include information identifying the product and face value of the coupon, and any other information that has been downloaded from the point-of-sale subsystem 112 or scanned or otherwise entered into the coupon redemption subsystem 104 during the coupon verification process. According to one embodiment of the present invention, the report of redeemed coupons, a release of the verifying coupons transferring ownership of those coupons from the retailer to the third party verification service, and a check are printed using the printer 332 of the coupon redemption subsystem 104 at the close of the coupon redemption session. An example of a combined retailer report, release and check is illustrated in FIG. 7. Accordingly, payment of the amounts by which the retailer has properly discounted sales to consumers in response to the receipt of valid coupons may be made immediately following the coupon verification process, and closely following acceptance of the coupon by the retailer. For instance, where the verification process is conducted daily, reimbursement for discounts extended to consumers by the retailer can be provided to the retailer daily. Alternatively, a check may be issued by a central office of the coupon verification service, or an electronic funds transfer may be made. Reimbursement is made to the retailer within at least ten days of the completion of the coupon verification process and, preferably, within five days of the retailer crediting the customer for the coupon amount. More preferably, payment is made to the retailer immediately (same day or next day) following completion of the verification process.

According to one embodiment of the present invention, information concerning the redemption of coupons may be transmitted from the CPU 300 of the coupon redemption subsystem 104 to a data center 124 over the second communication channel 116. Preferably, the data center 124 collects and collates information received from various coupon redemption subsystems 104. The third party verification service may then provide each manufacturer with a comprehensive report of coupon redemptions. These reports may contain any of the information downloaded to, scanned by, or otherwise collected by the coupon redemption system 104 (step 612). According to one embodiment of the present invention, the information stored in the data center 124 may be accessible by the manufacturer directly. For instance, manufacturers may be allowed to search the data center using a connection established over the Internet.

Alternatively, reports may be prepared by the third party verification service and provided to the manufacturer. According to one embodiment of the present invention, the manufacturer may specify the format of and information included in the provided report. For instance, the manufacturer may request information concerning selected time periods or regions of various scope. The manufacturer may also request information concerning particular retailers, stores or even lanes in a store. Information on the report may also be limited to particular categories or product codes. Additionally, information regarding redeemed coupons may be limited to particular family, offer or value codes. The report may also include coupons verified electronically and/or manually.

Within the general queries formulated by selecting items such as those described above, the returned information may be subdivided into various groupings. For instance, the information may be grouped according to the time period, region, retailer, product, coupon or clearing method. Furthermore, reports may be requested in summary form, or as complete listings.

In order to obtain reimbursement for amounts paid to retailers on behalf of the product manufacturers, as illustrated in FIG. 9, the third party verification service may provide an invoice to each product manufacturer. The invoice may summarize such items as the number of coupons verified, the total face value of the coupons, a calculation of the redemption fee, and a total amount owed to the third party verification service. In addition to providing such information for the period covered by the invoice (e.g. a single day), the invoice may provide year-to-date information. A report, as described above, may be enclosed with the invoice.

Optionally, the manufacturer may also be provided with the original verifying coupons. If the manufacturer desires, it may conduct its own audit of the verifying coupons and the report of discounts paid for by the third party verification service.

Following receipt of the invoice, the manufacturer may make payment to the third party verification service in the amount of the face value of the redeemed coupons, plus the handling fee (step 616).

If at step 604 a match cannot be made among a discount, product sale and an input coupon, the verifying coupons are sent to the manufacturer for processing (step 620). The processing by the manufacturer may comprise the steps conventionally taken by the manufacturer to verify the proper redemption of coupons. Accordingly, the provision of verifying coupons to the manufacturer may comprise the provision of all un-matched coupons relating to the manufacturer to the manufacturer's agent for examination. In addition, the manufacturer or manufacturer's agent may be provided with information collected by the point-of-sale system 112 and/or information entered into the coupon redemption system 104. For instance, such information may be provided to a coupon redemption authority 120 using the second communications channel 116.

If the manufacturer decides to accept the coupon (step 624) the third party verification service receives the face value of the accepted coupon plus a handling fee (step 628). The face value of the accepted coupons may then be paid by the third party verification service to the retailer (step 632). A manufacturer may choose to accept an improperly redeemed coupon for a variety of reasons. For instance, the manufacturer may wish to maintain cordial relationships with its retailers. In addition, in view of the detailed sales information that may be provided by the present invention, even in connection with redemptions not verified by the third party service, the manufacturer may find that consumers are redeeming coupons intended for particular product configurations for alternate configurations. For example, the manufacturer may issue a coupon intended only for a product in a particular packaging configuration or in particular flavor, but may nonetheless honor the coupon if redeemed in connection with the sale of the product in some other package or flavor. In addition to using the detailed sales information for determining whether a redemption was "close enough," the manufacturer may also use the information to persuade the retailer to stock a particular flavor or product configuration, thereby allowing the manufacturer to increase the amount of shelf space allocated to it in the retailer's store.

If at step 624 the manufacturer does not accept the particular coupon that was audited, no payment is made to the third party verification service, and accordingly no payment is made to the retailer in connection with the redemption of the rejected coupon (step 636). In another embodiment, the third party verifier may decide unilaterally to reimburse the retailer for the unverified coupon. In such a case, the third party verifier may seek reimbursement from the manufacturer by providing the manufacturer with a report that identifies such an unverified coupon.

It can be appreciated that some overlap may occur between product sales recorded in the point of sale subsystem 112 and the audit coupons removed from the secure storage container by the coupon verification personnel. For example, and in particular where product sales information is downloaded at the time the coupon verification personnel arrive at the retailer, or where such information is provided to the coupon redemption system 104 continuously, discounts extended by the retailer to consumers may be entered in the point of sale system 112 that do not have corresponding audit coupons in the secure storage container. For example, information may have been downloaded to the coupon redemption system 104 before the cashier (or other individual) has had the opportunity to place the redeemed coupon associated with such a sale in the secure storage container (which redeemed coupon then becomes the verifying or audit coupon) for review by the coupon verification personnel. In such instances, product sales and associated discounts for which no match with an audit coupon was made may be retained in the coupon redemption subsystem 104 until a subsequent coupon verification session.

A further explanation of such overlap is provided by the following example. Assume that the coupon redemption subsystem 104 conducts a first audit session of a first plurality of coupons and then conducts a second audit session of a second plurality of coupons. The first plurality of coupons includes a number of sets of audit coupons, with each set being associated with a different customer and a corresponding different transaction involving one or more coupons for that customer. Likewise, the second plurality of coupons includes a number of sets of coupons, with each set involving a different customer redeeming one or more coupons. At a desired or predetermined time at which these first plurality of coupons are located in the secure storage container, the coupon verification entity removes all of these first plurality of coupons for verification using the coupon redemption subsystem 104. During the time that the coupon redemption subsystem 104 is conducting its verification process associated with the first plurality of coupons, the POS subsystem 112, as an example, inputs or otherwise provides coupon information for a number of customers totaling ten different coupons. Consequently, the coupon redemption system 104 has coupon information for at least ten coupons for which there will be no match or correspondence with the coupons then being audited during the first audit session. The coupon information for each of these ten coupons is stored in a properly identified file or storage area for subsequent access and comparison during the second audit session involving the second plurality of audit coupons. In that regard, it is anticipated that the second plurality of audit coupons includes coupons having information corresponding to the overlap coupon information that is kept in the properly identified storage area of the coupon redemption subsystem 104. As a result, such previously stored information is also invoked or relied on in conducting the verifying procedures or steps previously discussed. In the present example, the ten coupons for which there was no match or correspondence during the first audit session are taken into account during the second audit session. Under usual circumstances, the coupon information associated with each of these ten coupons is expected to be matched with the audit coupons that are part of the second audit session. As can be understood, there may be overlap coupon information input from the POS subsystem 112 during each of the coupon audit sessions conducted by the coupon redemption subsystem 104, with such overlap coupon information to be taken into account during one or more later coupon audit sessions.

Figure 8:
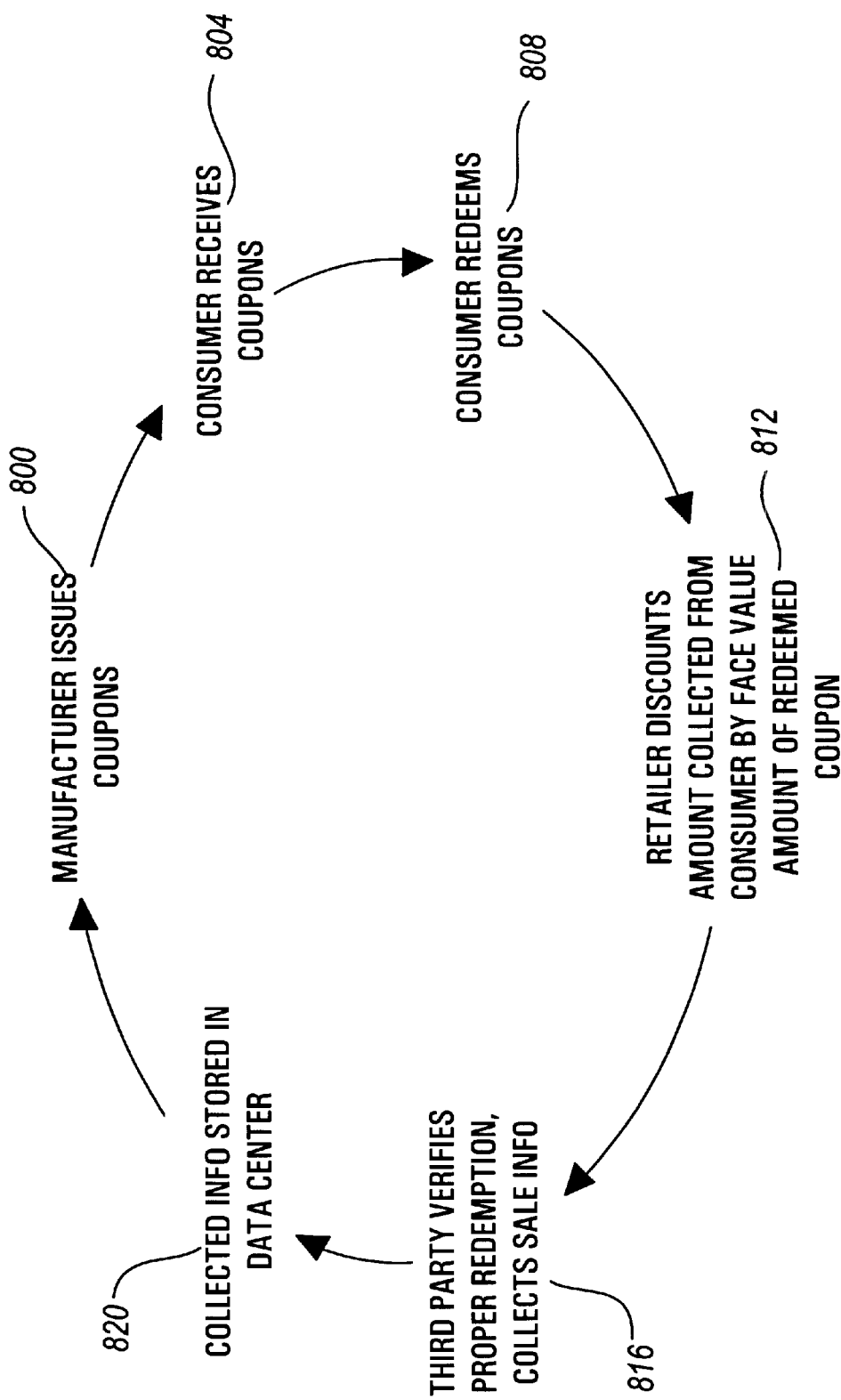
FIG. 8 is a flow chart representing the flow of information concerning coupons redeemed according to an embodiment of the present invention.

With reference now to FIG. 8, the flow of information between the parties involved in the redemption of a coupon according to the present invention is illustrated. Initially, the manufacturer 800 issues or authorizes the issuance of coupons to the consumer 804. The consumer selects the coupons that he or she wishes to use, and redeems them in connection with the purchase of a product 808. At step 812, the retailer extends a discount to the consumer in the amount of the face value of the coupon and takes possession of the coupon. Audit or verifying coupons are then provided to the third party verification service for verification of proper redemption 816. Information collected during the verification process is stored in the data center 120 (step 820) and made available to the manufacturer. Accordingly, the manufacturer is provided with feedback concerning the redemption of authorized coupons. This feedback allows the manufacturer to adjust its promotions in response to consumer demand. The feedback to the manufacturer by the present invention is provided very quickly, as the information concerning the coupon redemption is collected electronically, and may, according to one embodiment, be accessed by the manufacturer almost immediately following collection.

In accordance with the present invention, methods and apparatus for verifying the proper redemption of manufacturer coupons are provided. The invention in its broader aspects relates to an economical method and apparatus for providing detailed information concerning the redemption of coupons shortly after redemption takes place. In addition, such methods and apparatus allow the prompt reimbursement of retailers for discounts extended to consumers in connection with the use of coupons.

The foregoing discussion of the invention has been presented for purposes of illustration and description. Further, the description is not intended to limit the invention to the forms disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their application or use of the invention. It is intended that the appended claims be construed to include alternative embodiments to the extent permitted by the prior art.

What is claimed is:

1. A method for handling coupons, comprising:

redeeming at a first location a plurality of input coupons including at least first and second input coupons during a first time interval using a main computer system including a first coupon input device;

transporting to a second location a plurality of verifying coupons to an auxiliary computer system including an auxiliary coupon input device, said verifying coupons being the same as said input coupons when said redeeming step is properly conducted, said transporting step being conducted within five days of said redeeming step;

making a determination related to whether said redeeming step was properly conducted using said auxiliary computer system and said plurality of verifying coupons, said making a determination step including comparing input coupon information associated with said plurality of input coupons with verifying coupon information associated with said plurality of verifying coupons, wherein at least said verifying coupon information is input to said auxiliary coupon input device, said making a determination step further including determining whether a match exists between said verifying coupon information and a number of products identified when said plurality of input coupons were redeemed;

generating non-match information related to at least one non-match between said input coupon information and said verifying coupon information; and reimbursing for at least some of said plurality of input coupons, said reimbursing step being conducted within five days of said making step.

2. A method, as claimed in claim 1, wherein:

said main computer system is located at a retailer facility and said auxiliary computer system is also located at said retailer facility.

3. A method, as claimed in claim 1, wherein:

said auxiliary computer system includes a secure lock box and said transporting step includes carrying said plurality of verifying coupons from a first checkout station located at a first retailer facility to said auxiliary computer system at predetermined intervals, wherein said plurality of verifying coupons are placed in said secure lock box.

4. A method, as claimed in claim 1, wherein:

said reimbursing step includes reimbursing an acceptor of said plurality of input coupons.

5. A method, as claimed in claim 4, wherein:

said acceptor includes a retailer having a retailer facility and said reimbursing step includes providing money to the retailer to compensate the retailer related to said at least some of said plurality of input coupons before said at least some of said plurality of coupons are transferred from the retailer facility.

6. A method, as claimed in claim 1, wherein:

said main computer system and said auxiliary computer system are located at a retailer facility having at least a first check-out station, said transporting step includes manually carrying said plurality of verifying coupons from adjacent said first check-out station to an area in said retailer facility having said auxiliary computer system, and said reimbursing step includes providing a money payment to the retailer related to said at least some of said plurality of input coupons.

7. A method, as claimed in claim 1, wherein:

when said comparing step determines that a match does not exist between each of said verifying coupon information associated with said plurality of verifying coupons and said number of products, ascertaining whether reimbursement is to be provided for each of said plurality of verifying coupons that is non-matched.

8. A method, as claimed in claim 7, wherein:

said ascertaining step includes inquiring of a retailer involved with said redeeming step whether to reimburse and making a decision whether or not to reimburse the retailer.

9. A method, as claimed in claim 1, wherein:

said making a determination step includes determining whether a match exists involving said input coupon information associated with said plurality of coupons using additional coupon information from said main computer system associated with additional coupons that were redeemed and which are different from said plurality of input coupons, said additional coupons being redeemed after said first time interval.

10. A method, as claimed in claim 9, further including:

maintaining in storage memory said additional coupon information associated with said additional coupons and using said additional coupon information when utilizing a second plurality of input coupons.

11. A method, as claimed in claim 1, further including:

generating match information related to a match between said input coupon information associated with said plurality of input coupons and said verifying coupon information associated with said plurality of verifying coupons.

12. A method, as claimed in claim 1, further including:

generating reimbursing information related to reimbursing for at least one of said verifying coupons for which there is no match with said input coupon information associated with said plurality of input coupons.

13. A method, as claimed in claim 1, further including:

generating non-reimbursement information related to at least one of said verifying coupons for which there was no match with said input coupon information associated with said plurality of input coupons and for which no reimbursement was made.

14. A method, as claimed in claim 1, further including:

storing information related to identities of said plurality of input coupons by name of retailer that accepted said plurality of input coupons and by name of a manufacturer associated with each of said plurality of input coupons.

15. A method, as claimed in claim 1, further including:

after said reimbursing step, sending said at least some of said plurality of input coupons to a manufacturing agent or a manufacturer and without sending them to a clearinghouse involved with clearing coupons.

16. A method, as claimed in claim 1, wherein:

said making a determination step is conducted after a number of product transactions involving a number of different customers and in which said plurality of input coupons are provided by said number of different customers.

17. A method, as claimed in claim 1, wherein:

said main computer system also includes a processor, a storage and a communications interface, said storage storing said input coupon information and said product information, and said input coupon information and said product information being communicated to said auxiliary computer system using said communications interface.

18. A system involved with handling coupons, comprising:

a main computer subsystem including a coupon information input device located at a first location that provides input coupon information from a first plurality of input coupons, said input coupon information including identification information related to identifying said first plurality of input coupons and product information related to products purchased, said main computer subsystem also including a communications interface, at least one processor and a storage that stores said identification information and said product information, said communications interface communicating with said at least one processor and said at least one processor communicating with said storage, wherein said identification information and said product information can be downloaded using said communications interface; and an auxiliary computer subsystem that receives said input coupon information from said main computer subsystem, said auxiliary computer subsystem including an auxiliary coupon information input device located at a second location and at least a first processor, said auxiliary coupon information input device receiving a first plurality of verifying coupons related to determining whether correspondence exists with said first plurality of input coupons, said first processor used in determining whether a match exists between said first plurality of input coupons and said first plurality of verifying coupons, said auxiliary coupon information input device inputting coupon information to said auxiliary computer subsystem during a time different from said auxiliary computer subsystem receiving said input coupon information from said main computer subsystem.

19. A system, as claimed in claim 18, wherein:

said auxiliary computer subsystem also receives additional coupon information related to additional coupons different from said first plurality of input coupons, said first processor taking into account said additional coupon information when determining whether a match exists between said first plurality of input coupons and said first plurality of verifying coupons.

20. A system, as claimed in claim 19, wherein:

said additional coupon information is used by said first processor when determining whether a match exists between a second plurality of input coupons and a second plurality of verifying coupons.

21. A system, as claimed in claim 18, wherein:

said auxiliary computer subsystem includes storage memory for storing first information related to a match between at least a first input coupon of said first plurality of input coupons and a first verifying coupon of said first plurality of verifying coupons and for storing second information related to a non-match involving at least one of a second input coupon of said first plurality of input coupons and a second verifying coupon of said first plurality of verifying coupons.

22. A method, as claimed in claim 21, wherein:

said storage memory stores third information related to whether a reimbursement was made for said second verifying coupon of said first plurality of verifying coupons.

23. A system, as claimed in claim 18, wherein:

said auxiliary computer subsystem includes check printing hardware that provides a check used to reimburse the retailer having said main computer subsystem for at least some of said first plurality of input coupons.

24. A method involving the handling of coupons, comprising:

providing a main computer subsystem at a facility of a retailer and an auxiliary computer subsystem in communication with said main computer subsystem, said main computer subsystem including at least a first coupon information input device and said auxiliary computer subsystem including at least an auxiliary coupon information input device;

inputting during a first time interval a first plurality of input coupons for redemption from at least a first customer using said first coupon information input device, each of said first plurality of input coupons including input coupon information;

inputting during said first time interval a first plurality of product information related to products being purchased;

redeeming at least one of said first plurality of coupons for the first customer using said input coupon information and said first plurality of product information;

communicating said input coupon information related to at least said first plurality of input coupons to said auxiliary computer subsystem using said main computer subsystem;

communicating said first plurality of product information to said auxiliary computer subsystem using said main computer subsystem;

transporting a first plurality of verifying coupons to said auxiliary computer subsystem, each of said first plurality of verifying coupons including verifying coupon information and said first plurality of verifying coupons to be used in determining whether said first plurality of verifying coupons correspond to said first plurality of input coupons in kind and number;

inputting said verifying coupon information associated with said first plurality of verifying coupons using said auxiliary coupon input information device;

determining whether there is correspondence between each of said verifying coupon information associated with said first plurality of verifying coupons and at least one of said input coupon information associated with said first plurality of input coupons;

ascertaining whether there is correspondence between each of said verifying coupon information of said first plurality of verifying coupons and at least one of said product information using said auxiliary computer subsystem; and reimbursing the retailer for at least some of said first plurality of input coupons.

25. A method, as claimed in claim 24, further including:

withholding reimbursement to the retailer for at least one of said first plurality of input coupons when said determining step determines that there is no correspondence between said at least one input coupon information associated with said first plurality of input coupons and said first verifying coupon information associated with said first plurality of verifying coupons.

26. A method, as claimed in claim 24, wherein:

said step of communicating said input coupon information includes communicating additional coupon information related to additional coupons different from said first plurality of input coupons before completing said determining step and in which said determining step does not rely on said additional coupon information when determining whether each of said verifying coupon information associated with said first plurality of verifying coupons corresponds to said at least one of said input coupon information associated with said first plurality of input coupons.

27. A method, as claimed in claim 24, wherein:

said auxiliary computer subsystem is located at the facility of the retailer and said reimbursing step includes printing a check made out to the retailer or providing an electronic fund transfer to the retailer within five days of completing all said inputting steps.

28. A method, as claimed in claim 24, further including:

shipping said first plurality of input coupons to at least one agent of manufacturers or a manufacturer associated with said first plurality of input coupons under the responsibility of a party independent of the retailer and without clearing said first plurality of input coupons by a coupon clearinghouse.

29. A method, as claimed in claim 24, wherein:

when said ascertaining step ascertains that no correspondence exists involving said products purchased during said time interval and said verifying coupon information associated with said plurality of verifying coupons, deciding whether reimbursement is to be provided to the retailer.

30. A method, as claimed in claim 24, wherein:

said reimbursing step includes transferring ownership rights to a third party independent of the retailer before said at least some of said plurality input coupons are removed from the retailer facility.

31. A method, as claimed in claim 24, further including:

submitting an invoice for payment, to at least one manufacturer or a manufacturer's agent associated with said at least some of said first plurality of input coupons, by a third party who is independent of the retailer and after the third party has received ownership rights for said at least some of said first plurality of input coupons.

32. A method, as claimed in claim 24, wherein:

said main computer subsystem includes a processor, a storage and a communications interface, said storage storing said input coupon information and said first plurality of product information and in which said step of communicating said input coupon information includes obtaining said input coupon information from said storage using said processor and sending said input coupon information to said auxiliary computer subsystem using said communications interface.

* * * * *